United States Patent
Cai et al.

(10) Patent No.: US 9,254,469 B2
(45) Date of Patent: Feb. 9, 2016

(54) TREATMENT OF SYNTHESIS GASES FROM A GASIFICATION FACILITY

(71) Applicants: SIEMENS AKTIENGESELLSCHAFT, München (DE); CLARIANT INTERNATIONAL LTD., Muttenz (CH)

(72) Inventors: Yeping Cai, Louisville, KY (US); William M. Faris, Louisville, KY (US); Christian Görsch, Leipzig (DE); Frank Hannemann, Freiberg (DE); Doris Klostermann, Freiberg (DE); Robert Marx, München (DE); Manfred Schingnitz, Freiburg (DE); Justin Wang, Louisville, KY (US); Ling Xu, München (DE)

(73) Assignees: SIEMENS AKTIENGESELLSCHAFT (DE); CLARIANT INTERNATIONAL LTD. (CH)

( * ) Notice: Subject to any disclaimer, the term of this patent is extended or adjusted under 35 U.S.C. 154(b) by 0 days.

(21) Appl. No.: 14/551,664

(22) Filed: Nov. 24, 2014

(65) Prior Publication Data

US 2015/0144842 A1     May 28, 2015

(30) Foreign Application Priority Data

Nov. 25, 2013   (DE) .......................... 10 2013 224 039

(51) Int. Cl.
*C01B 3/38*     (2006.01)
*B01J 8/18*     (2006.01)
*B01J 8/00*     (2006.01)
(Continued)

(52) U.S. Cl.
CPC ........ *B01J 8/18* (2013.01); *B01J 8/0005* (2013.01); *B01J 8/02* (2013.01); *B01J 8/0285* (2013.01); *C01B 3/16* (2013.01); *B01J 2208/027* (2013.01);
(Continued)

(58) Field of Classification Search
CPC ............................................... C01B 2203/0288
See application file for complete search history.

(56) References Cited

FOREIGN PATENT DOCUMENTS

| CN | 101 050 391 | 10/2007 |
|----|-------------|---------|
| CN | 101050391 A | 10/2007 |

(Continued)

OTHER PUBLICATIONS

Bell D.A., et al., Coal Gasification and its Applications, Verlag Elsevier, 2011.

(Continued)

*Primary Examiner* — Melvin C Mayes
*Assistant Examiner* — Kenneth Vaden
(74) *Attorney, Agent, or Firm* — Ostrolenk Faber LLP

(57) ABSTRACT

A technology for producing synthesis gas from crude gas from various gasification processes for solid or liquid fuels. To limit the temperatures in a subsequent strongly exothermic CO shift reaction to adjust the $H_2$/CO ratio, the crude gas which has been freed of dust flows through two shift reactors arranged in series. The first reactor has a specific reaction-kinetically limited catalyst and the second reactor has a conventional sour gas catalyst. The specific catalyst used in the first reactor limits the exothermic shift reaction to such an extent that the reaction temperatures in the first and second reactors remain so low to avoid thermal damage to the catalysts even without introduction of external steam, and the desired gas composition is achieved.

32 Claims, 6 Drawing Sheets

Figure 1:
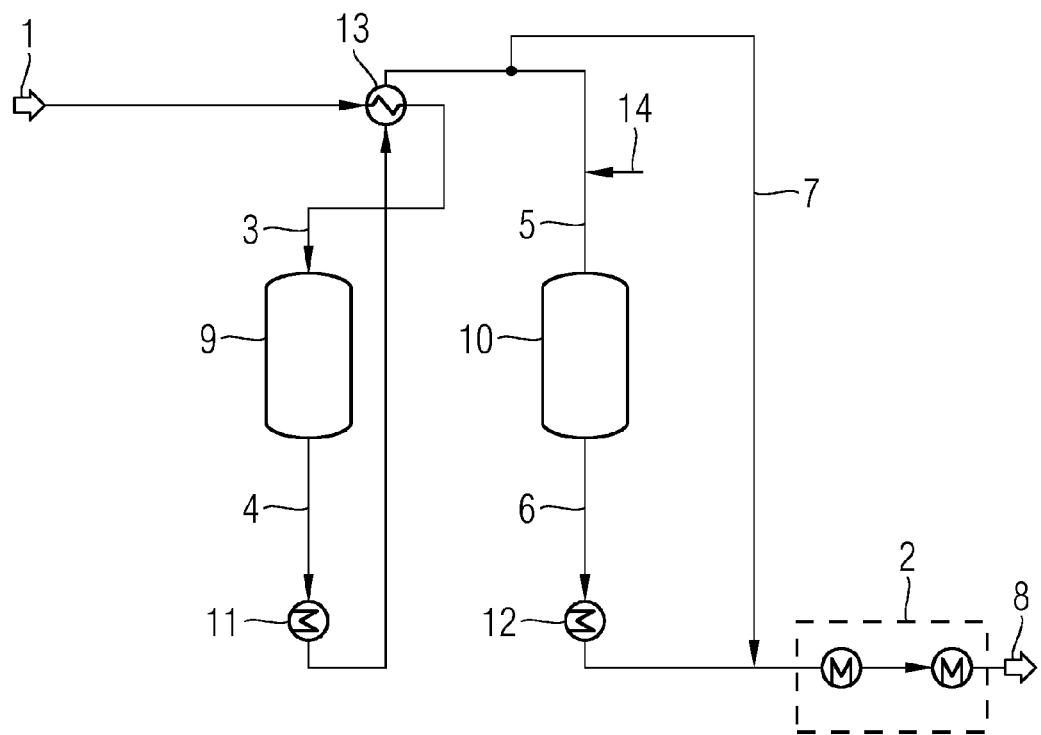

(51) Int. Cl.
  *B01J 8/02* (2006.01)
  *C01B 3/16* (2006.01)

(52) U.S. Cl.
  CPC . *C01B 2203/0288* (2013.01); *C01B 2203/0877* (2013.01); *C01B 2203/0883* (2013.01)

(56) References Cited

FOREIGN PATENT DOCUMENTS

| CN | 101 412 932 | 4/2009 |
|---|---|---|
| CN | 101412932 A | 4/2009 |
| DE | 147 188 | 3/1981 |
| EP | 2 133 308 A1 | 12/2009 |
| EP | 2 157 156 A1 | 2/2010 |
| GB | 2 004 993 A | 4/1979 |
| WO | WO 2013/072660 A1 | 5/2013 |
| WO | WO 2013/088116 A1 | 6/2013 |

OTHER PUBLICATIONS

Higman C., et al., Gasification, Verlag Elsevier, p. 124, 2003.
Schmalfeld J., et al., Die Veredlung und Umwandlung von Kohle, Technologien und Projekte 1970 bis 2000 in Deutschland, Deutsche Wissenschaftliche Gesellschaft für Erdöl, Erdgas und Kohle e.V., Kapitel 4.4.2 Gaskombinat Schwarze Pumpe-Verfahren (GSP), pp. 537-552, Dec. 2008.
Morabiya Y.J., et al., Modeling & Simulation of Water Gas Shift Reaction, International Journal of Scientific Engineering and Technology, vol. No. 1, Issue No. 3, pp. 106-110, Jul. 2012, ISSN: 2277-1581, Jul. 1, 2012.

FIG 4

| Strom | Reactor-1 (9) | | Reactor-2 (10) | | |
|---|---|---|---|---|---|
| | (3) | (4) | (14) | (5) | (6) |
| | Rohgas ein | Gas aus | Dampf ein | Gemischtes Gas ein | Gas aus |
| | Gaszusammensetzung nass, mol% | | | | |
| CO | 51.9 | 40.0 | | 22.5 | 3.71 |
| CO2 | 4.00 | 15.9 | | 8.97 | 27.8 |
| H2 | 19.8 | 31.7 | | 17.8 | 36.6 |
| N2 | 1.15 | 1.15 | | 0.65 | 0.65 |
| Ar | 0.08 | 0.08 | | 0.04 | 0.04 |
| H2O | 23.1 | 11.1 | 100 | 50.0 | 31.2 |
| | | | | | |
| S/G | 0.30 | 0.13 | | 1.00 | 0.45 |
| P, psig | 565 | 564 | | 564 | 560 |
| T, C | 245 | 377 | | 230 | 413 |

FIG 5

| Strom | Reactor-1 (9) | | Reactor-2 (10) | | |
|---|---|---|---|---|---|
| | (3) | (4) | (14) | (5) | (6) |
| | Rohgas ein | Gas aus | Dampf ein | Gemischtes Gas ein | Gas aus |
| | Gaszusammensetzung nass, mol% | | | | |
| $CH_4$ | 0.02 | 0.02 | | 0.02 | 0.02 |
| CO | 30.9 | 22.3 | | 22.3 | 4.53 |
| $CO_2$ | 2.14 | 10.8 | | 10.8 | 28.5 |
| $H_2$ | 11.8 | 20.4 | | 20.4 | 38.2 |
| $N_2$ | 0.34 | 0.34 | | 0.34 | 0.34 |
| Ar | 0.23 | 0.23 | | 0.23 | 0.23 |
| $H_2O$ | 54.5 | 45.9 | | 45.9 | 28.2 |
| S/G | 1.20 | 0.85 | | 0.85 | 0.39 |
| P, psig | 493 | 485 | | 485 | 481 |
| T, C | 245 | 340 | | 245 | 416 |

FIG 6

| Strom | Reactor-1 (9) | | | Reactor-2 (10) | | |
|---|---|---|---|---|---|---|
| | (3) | (4) | (14) | (5) | | (6) |
| | Rohgas ein | Gas aus | Dampf ein | Gemischtes Gas ein | | Gas aus |
| | Gaszusammensetzung nass, mol% | | | | | |
| CH4 | 0.06 | 0.06 | | 0.06 | | 0.06 |
| CO | 41.6 | 28.9 | | 28.9 | | 12.9 |
| CO2 | 3.44 | 16.1 | | 16.1 | | 32.1 |
| H2 | 16.8 | 29.4 | | 29.4 | | 45.5 |
| N2 | 0.38 | 0.38 | | 0.38 | | 0.38 |
| Ar | 0.31 | 0.31 | | 0.31 | | 0.31 |
| H2O | 37.5 | 24.9 | | 24.9 | | 8.80 |
| | | | | | | |
| S/G | 0.60 | 0.33 | | 0.33 | | 0.10 |
| P, psig | 711 | 708 | | 708 | | 706 |
| T, C | 232 | 370 | | 220 | | 378 |

TREATMENT OF SYNTHESIS GASES FROM A GASIFICATION FACILITY

CROSS-REFERENCE TO RELATED APPLICATIONS

The present application is claims priority of German Patent Application No. 102013224039.2, filed Nov. 25, 2013, the contents of which are incorporated by reference herein.

TECHNICAL FIELD

The invention relates to an apparatus and a process for producing defined $H_2$- and CO-containing synthesis gases or technical-grade hydrogen which are suitable for producing chemical products such as methanol, dimethyl ether, ammonia, methane and their downstream products and fuels, for example by the Fischer-Tropsch technology.

TECHNICAL BACKGROUND

Various processes taking into account the use of different fuels and objectives have become established for producing synthesis gases, and these represent the prior art today. Mention may be made of various modifications of entrained-flow gasification of dust-like and liquid fuels, fixed-bed gasification of particulate solid fuels and also fluidized-bed gasification which is increasingly being chosen for the use of biomasses.

In the technology of entrained-flow gasification, dust-like or liquid fuels are converted by means of a gasification agent containing free oxygen at pressures of up to 10 MPa and temperatures of up to 1900° C. into an $H_2$- and CO-rich crude synthesis gas. Solid fuels here are coals of various degrees of carbonization which have been milled to fuel dust, or cokes, in particular petroleum cokes, biomasses or utilizable fractions obtained from residual and waste materials. This technology has been comprehensively described in "Die Veredelung und Umwandlung von Kohle", Schingnitz, chapter 4.4.2, GSP-Vergasung, published by the Deutschen Wissenschaftlichen Gesellschaft fur Erdöl, Erdgas und Kohle e.V., December 2008. The introduction of the fuel dust into the gasification system which is under the stated pressure occurs by means of a fuel dust-carrier gas suspension having feed densities of 100-550 kg/m³ in the region of flow transport, as shown in patent document DD 147 188. Liquid fuels are heavy oils, tars and asphalts as relatively high-boiling products of petroleum processing and also of coal upgrading, for example low-temperature carbonization or coking. The liquid fuels are converted into a fine spray and likewise gasified by means of oxygen and water vapor in an entrained-flow stream, see Ch. Higman et al. "*Gasification*" chapter "Oil Gasification", Elsevier publishers, 2003.

The hot crude gasification gas leaves the gasification chamber at temperatures of up to 1900° C. and pressures of up to 10 MPa together with the fuel ash which has been liquefied to slag and also fly ash and soot and is cooled directly by spraying in water or indirectly in a waste heat boiler. To separate out entrained dusts, in particular fine dusts, the crude gas goes through a cascade of water scrubbing systems or dry filters in order to remove the dust to a concentration of 1 mg/m³ (STP), preferably 0.1 mg/m³ (STP).

In the fixed-bed gasification of particulate fuels at pressures of up to 6 MPa, the crude gas having a temperature of 400-600° C. is, after leaving the reactor, cooled to such an extent that the entrained hydrocarbons are condensed out and precipitated. More detailed descriptions may be found in D. A. Bell et al. "Coal Gasification and its Applications", chapter Moving Bed Gasifiers, Elsevier publishers 2011, where the fluidized-bed technology is also described in more detail.

The technology of endothermic steam reforming of light hydrocarbons such as natural gas, liquefied petroleum gas and light petroleum spirit at pressures of up to 3 MPa and temperatures of up to 850° C. in externally heated catalyst-containing cracking tubes deserves particular emphasis and is comprehensively described in the standard literature.

In all gasification processes, the $H_2$/CO ratio formed initially in the gasification is not able to meet the requirements of downstream syntheses.

The known catalyzed shift reaction

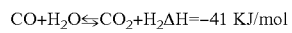

makes it possible to alter the $H_2$/CO ratio of 1:2 present in the crude gas to the ratio of about 2:1 required in the synthesis of methanol and the Fischer-Tropsch synthesis or further to produce technical-grade hydrogen. Industrial solutions are disclosed in the patents EP 2133308 and EP 2157156, and a comprehensive description of the reaction kinetics may be found in the Int. Journal of Scientific Engineering and Technology, July 2012, No. 3, pages 106-110, Y. J. Morabiya et al., "Modeling and Simulation of Water Gas Shift Reaction".

There are conventionally shift plants which are made up of two stages. The crude gas which has been freed of dust leaves the water scrub or dry dust precipitation at temperatures of 180-220° C. and is heated in countercurrent to the converted gas to the light-off temperature of the catalyst of 200-300° C. and fed into a first reactor. The high evolution of heat in the shift reaction of 41.2 kJ/mol leads to strong heating in the shift reactor. To limit this, steam is added to the crude gas before entry into the reactor; this would not be thermodynamically necessary and serves purely for cooling the system. The crude gas which has been partially shifted in the first reactor is directly or indirectly cooled and fed to a second reactor to effect a further reduction in the carbon monoxide concentration so as to obtain the desired $H_2$/CO ratio. The abovementioned addition of steam upstream of the first reactor represents a considerable cost factor and additionally requires larger reactors. The precise setting of the required $H_2$/CO ratio is effected by means of a bypass regulation which conveys part of the unshifted crude gas past one or both reactors and adds it to the shifted crude gas. High CO concentrations lead to temperature increases in the shift reactor due to the strongly exothermic nature of the reaction and these temperatures accelerate the methanation reactions

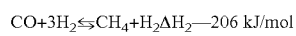

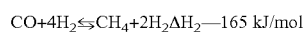

to an increasing extent, which leads, owing to the extremely high evolution of heat, to a further, even faster temperature rise. The shift reactor threatens to become overheated. To control the process, not only does the abovementioned additional introduction of steam have to take place but the CO content of the feed gas also has to be limited to <50% by volume (based on dry gas), which is difficult to achieve in industry. Various proposals have been made for controlling the problem. The company Lianxin Chemical Co. proposes reducing the steam/CO ratio before entry into the first shift reactor in the patents CN 101 050 391 A and CN 101 412 932 A. This proposal also requires a low entry temperature and also a potassium-promoted catalyst. In practical use, this means firstly cooling of the crude gas in order to condense out water vapor and subsequently reheating in order to introduce the crude gas in an unsaturated state into the shift reactor. The further condensation of water vapor in the catalyst bed is avoided thereby. This proposal means an energy loss and an additional outlay in terms of apparatus.

The patent document WO 2013 088 116 A1 proposes arranging cooling tubes in the catalyst bed in order to remove the heat of reaction by means of cold synthesis gas or steam and thus limit the temperature increase. Such reactors are complicated to manufacture, and uniform removal of heat from the catalyst bed is difficult. The second method is described in the patent document WO 2013 072 660 A1. As a further possibility, a significant increase in the space velocity through the catalyst bed of ≥12 500/h has been proposed in order to limit the reaction time. The subsequent second reactor corresponds to the abovementioned version with internal cooling. In the case of these proposals, too, the outlay in terms of apparatus is significantly higher.

SUMMARY OF THE INVENTION

It is an object of the invention to provide a two-stage shift plant in which the reaction temperatures in the first and second reactors remain so low that thermal damage to the catalysts and also formation of methane are ruled out even without introduction of external steam and the desired gas composition is achieved.

According to the invention, the object is achieved by the first reactor in a multistage shift plant being provided with a catalyst which provides reaction-kinetic activity that is limited (mild intrinsic activity) by means of a specific choice of the support material and the active components and which limits the shift reaction and thus prevents an excessively high temperature which damages the catalyst and promotes the methanation reaction.

The specific catalyst used in the first reactor limits the rate of the exothermic shift reaction to such an extent that the reaction temperatures in the first and second reactors remain so low that thermal damage to the catalysts is ruled out even without introduction of external steam and the desired gas composition is achieved.

In the invention, which can also be referred to as low steam CO shift, the water vapor formed in the preceding quenching process is on its own sufficient for the shift reaction and the limitation of the temperature, with neither condensation of water vapor nor introduction of additional steam being required.

When the catalyst which is commercially available as ShiftMax® 821 is used in the first reactor of the shift process, the previously tried and tested reactor constructions and operating conditions can be retained. The catalyst allows a wide use range of the water vapor/gas ratio of from 0.1 to 2.5, preferably from 0.2 to 1.8. The CO concentration in the dry crude gas can be from 40 to 90% by volume, preferably from 50 to 70% by volume. Sulfur contents in the range from 100 ppm to 5% by volume, preferably from 300 ppm to 2% by volume, are tolerated. The process pressure can be in the range from 0.1 to 12 MPa, preferably from 2 to 10 MPa. The support material of the reaction-kinetically limited catalyst consists of aluminum oxide, silicon oxide, magnesium oxide, manganese oxide, zinc oxide, titanium oxide, metal aluminates and combinations thereof. The active components are formed by molybdenum, tungsten, cobalt or nickel or combinations thereof. The total amount of molybdenum or a combination thereof is from 1 to 6% by mass, preferably from 2 to 5% by mass, and in the case of cobalt and nickel is up to 1.0% by mass, preferably up to 0.5% by mass, based on the total mass of the catalyst. The space velocity through the catalyst bed is from 1000 to 12 000/h, preferably from 2000 to 6000/h, at an inlet temperature of from 200 to 350° C., preferably from 230 to 300° C.

The shape of the catalyst can be cones, pellets, cylinders, hollow bodies or other bodies. The catalyst has a pore volume of from 0.2 to 1.5 cm$^3$/g, preferably from 0.3 to 0.7 cm$^3$/g. Its surface area is in the range from 50 to 400 m$^2$/g, preferably from 100 to 250 m$^2$/g. The catalyst is sulfided before operation is commenced.

For the purposes of the present patent application, reaction-kinetically limited means that the thermodynamic equilibrium state between reactants and products is not reached in the region of the catalyst at the space velocity used, the temperature used, the pressure used and the abovementioned inlet concentrations of CO in the crude gas.

The crude gas which has been partially shifted to CO contents of from 35 to 50% by volume of CO in the dry gas in the first reactor enters the second reactor which is provided with a typical catalyst for the sour gas shift. The steam/gas ratio is preferably in the range from 0.2 to 2.0, preferably from 0.3 to 1.2. Additional steam or crude gas which has been conveyed around the first reactor in the bypass can be added before the second reactor if necessary. Typical catalysts for the second reactor are ShiftMax® 820 and ShiftMax® 822 promoted with potassium. The possible space velocity based on dry partially shifted crude gas is from 1000 to 7000/h, preferably from 1500 to 4000/h. The inlet temperature can be in the range from 200 to 300° C., preferably from 220 to 300° C. As active components, molybdenum or tungsten or cobalt or nickel or combinations thereof are likewise utilized. The molybdenum and tungsten content is in the range from 4 to 12% by mass, preferably from 5 to 10% by mass, and the cobalt and nickel content is in the range from 1 to 7% by mass, preferably from 2 to 5% by mass. In addition, the catalyst contains from 3 to 10% by mass of an alkali metal as promoter. The support material consists of the same elements as in the case of the abovementioned catalyst. The specific surface area is in the range from 50 to 400 m$^2$/g, preferably from 100 to 250 m$^2$/g, and its pore volume is from 0.2 to 1.5 cm$^3$/g, preferably from 0.3 to 0.8 cm$^3$/g. The catalyst is sulfided before operation is commenced. Sulfiding can optionally take place in the reactor or outside the reactor.

BRIEF DESCRIPTION OF DRAWING EXAMPLES

Figure 2:
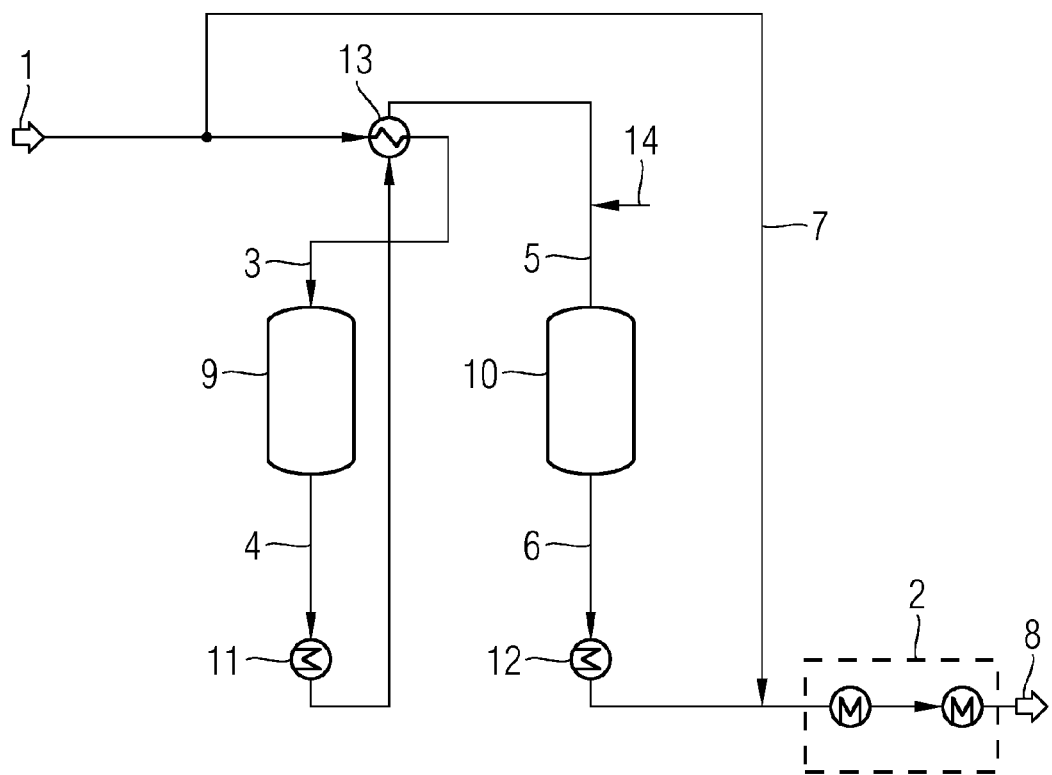
Figure 3:
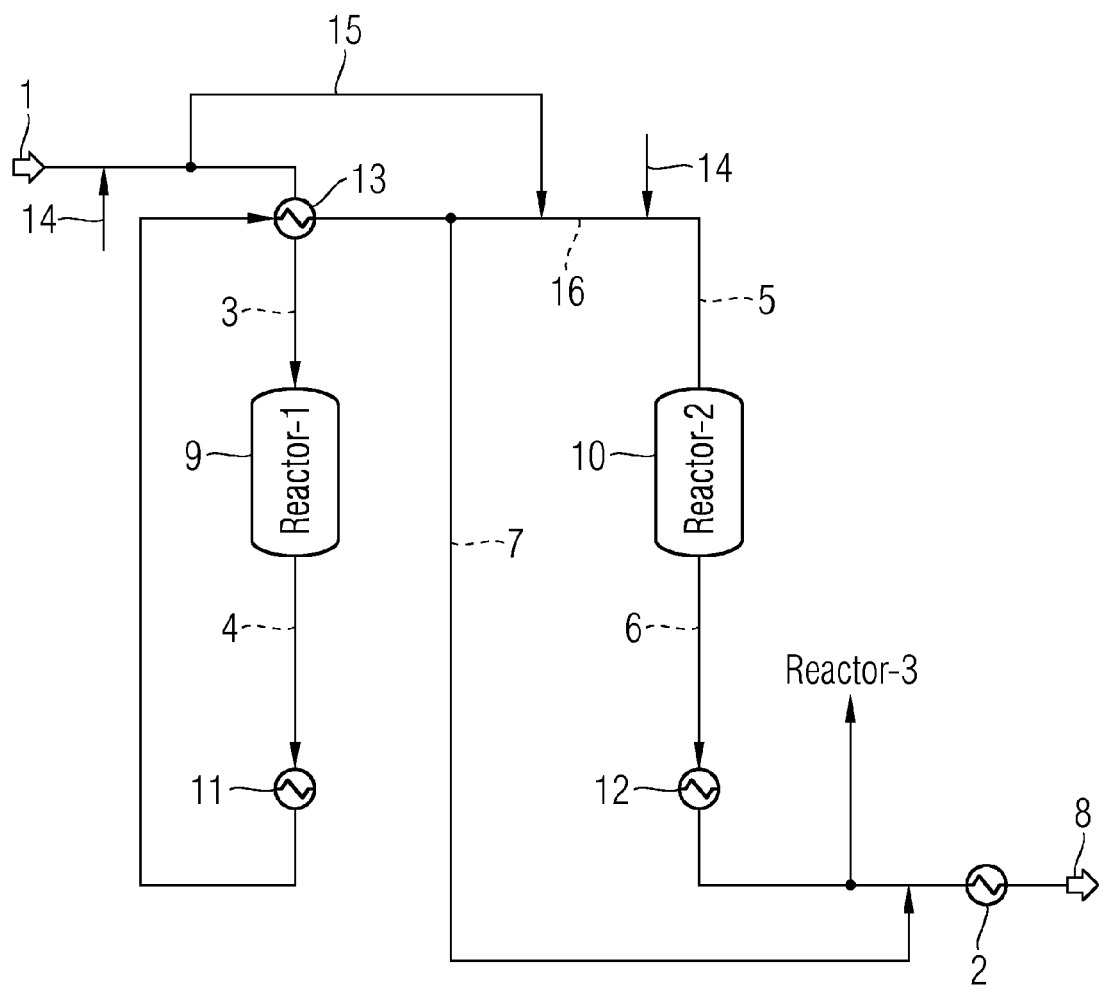

The invention is illustrated below as working example to an extent required for understanding, with the aid of figures. The figures show:

FIG. 1 a process flow diagram as per the solution according to the invention with a bypass after the first reactor, FIG. 2 a process flow diagram as per the solution according to the invention with a bypass conveying unshifted crude gas, FIG. 3 a process diagram showing the process of the invention, FIG. 4 a first table with characteristic values, FIG. 5 a second table with characteristic values and FIG. 6 a third table with characteristic values.

DESCRIPTION OF EMBODIMENTS

In the figures, identical designations indicate identical elements.

EXAMPLE 1

According to FIG. 1

In a gasification reactor having a gross output of 500 MW, 72 Mg/h of a fuel dust produced from hard coal is reacted with oxygen at a pressure of 4 MPa and a temperature of 1600° C. to form crude synthesis gas. The crude gas is cooled and at the same time saturated with water vapor at temperatures of 180-250° C. by spraying cooling and scrubbing water into a quenching chamber downstream of the gasification space. After going through various scrubbing stages, the crude gas stream 1 is, as shown in FIG. 2, fed under the following conditions to the first reactor 9, with heating of the crude gas stream 3 being carried out in countercurrent to partially shifted crude gas 4:

Temperature: 262° C.

Pressure: 3.9 MPa

Amount: 270 239 m³ (STP)/h

Analysis

| | |
|---|---|
| $H_2$ | 12.8% by volume |
| CO | 33.5% by volume |
| $CO_2$ | 1.8% by volume |
| $N_2$ | 0.4% by volume |
| $H_2O$ | 51.6% by volume |

Additional introduction of steam is not provided and also not necessary.

The reactor 9 is provided with a reaction-kinetically limited catalyst which limits the conversion of the carbon monoxide in the abovementioned exothermic shift reaction to the required extent.

After going through the first reactor 9, the partially shifted crude gas 4 is characterized by the following parameters:

Temperature: 327° C.

Pressure: 3.75 MPa

Amount: 270 239 m³ (STP)/h

Analysis

| | |
|---|---|
| $H_2$ | 19.3% by volume |
| CO | 27.0% by volume |
| $CO_2$ | 8.3% by volume |
| $N_2$ | 0.4% by volume |
| $H_2O$ | 45.0% by volume |

The exit temperature from the first reactor 9 is only 327° C. due to the limited shift reaction and does not represent any problem in respect of the thermal stability of the catalyst used. The hot partially shifted crude gas 4 is firstly partially cooled indirectly by generation of intermediate-pressure steam in the heat exchanger 11 and goes, after it has been utilized for preheating the unshifted crude gas 3, via the crude gas line 5 under the following conditions into the second reactor 10:

Temperature: 260° C.

Pressure: 3.7 MPa

Amount: 172 953 m³ (STP)/h

Analysis Corresponds to the partially shifted crude gas 4

After cooling, 97 286 m³ (STP)/h are branched off from the partially shifted crude gas 4, conveyed in the bypass 7 around the second reactor 10 and reintroduced into the crude gas 6 downstream of the second reactor 10. This bypass stream serves to set the desired $H_2$/CO ratio precisely. After the second reactor 10, the shifted crude gas 6 has the following parameters:

Temperature: 452° C.

Pressure: 3.6 MPa

Amount: 172 953 m³ (STP)/h

Analysis

| | |
|---|---|
| $H_2$ | 38.1% by volume |
| CO | 8.2% by volume |
| $CO_2$ | 27.0% by volume |
| $N_2$ | 0.4% by volume |
| $H_2O$ | 26.3% by volume |

It is cooled in the heat exchanger 12 to generate intermediate-pressure steam and mixed with the bypass stream 7, subjected to cooling 2 and fed via line 8 with the following parameters to a chemical or physical gas scrub to remove, in particular, the carbon dioxide and hydrogen sulfide:

Temperature: 40° C.

Pressure: 3.4 MPa

Amount: 181 114 m³ (STP)/h

Analysis

| | |
|---|---|
| $H_2$ | 46.7% by volume |
| CO | 22.2% by volume |
| $CO_2$ | 30.3% by volume |
| $N_2$ | 0.5% by volume |
| $H_2O$ | 0.3% by volume |

After removal of the carbon dioxide, the desired $H_2$/CO ratio in the synthesis gas of 2.1:1 is achieved. The water vapor produced in the quench was sufficient and introduction of external steam was not necessary.

EXAMPLE 2 as Per FIG. 2

The bypass stream 7 is taken as per FIG. 2 from a crude gas stream 1 from an autothermic oil gasification process under otherwise identical conditions as in example 1 upstream of the first reactor 9 and fed back in downstream of the heat exchanger 12. Compared to example 1, this decreases the load on the first reactor 9 but decreases the bypass stream 7 because of the higher CO content. Both the technologies as per example 1 and as per example 2 are possible. Additional steam is likewise not necessary.

EXAMPLE 3

In a gasification reactor having a gross output of 500 MW, 72 Mg/h of a fuel dust produced from hard coal is reacted with oxygen at a pressure of 4 MPa and a temperature of 1600° C. to form crude synthesis gas. The crude gas including the entrained slag, the fly dust and the soot is subsequently fed to a waste heat combination consisting of a radiation heat exchanger and downstream convection heat exchanger and cooled by generation of high-pressure and intermediate-pressure steam to 184° C., with an amount of steam of 143 t/h (14 MPa, 337° C.) being obtained.

The pressure is 3.88 MPa. The cooled crude gas is characterized by the following parameters:

Temperature: 184° C.
Pressure: 3.88 MPa
Amount: 187 061 m³ (STP)/h
Analysis

| | |
|---|---|
| $H_2$ | 18.5% by volume |
| CO | 48.4% by volume |
| $CO_2$ | 2.6% by volume |
| $N_2$ | 0.5% by volume |
| $H_2O$ | 30.0% by volume |

The crude gas is not saturated with water vapor by the indirect cooling. After preheating in the heat exchanger 13 against partially shifted gas from the first reactor 9 which is, as in example 1, provided with a reaction-kinetically limited catalyst, the crude gas which has been preheated to 269° C. enters the first reactor 9 and leaves it under the following conditions:

Temperature: 365° C.
Pressure: 3.75 MPa
Amount: 187 061 m³ (STP)/h
Analysis

| | |
|---|---|
| $H_2$ | 27.0% by volume |
| CO | 39.9% by volume |
| $CO_2$ | 11.1% by volume |
| $N_2$ | 0.5% by volume |
| $H_2O$ | 21.5% by volume |

The outlet temperature of the partially shifted crude gas from the first reactor 9 is only the desired 365° C. due to the reaction-kinetically limited shift reaction. After cooling to 254° C. in the heat exchanger 13 against the unshifted crude gas and partial introduction of steam 14 from the radiation and convection cooler of 15 540 m³ (STP)/h, the partially shifted crude gas enters and leaves the second reactor 10:

| | Entry | Exit |
|---|---|---|
| Temperature: | 254° C. | 440° C. |
| Pressure: | 3.69 MPa | 3.59 MPa |
| Amount: | 198 867 m³ (STP)/h | 198 867 m³ (STP)/h |
| | Analysis | |
| $H_2$ | 24.6% by volume | 41.8% by volume |
| CO | 36.4% by volume | 19.2% by volume |
| $CO_2$ | 10.1% by volume | 27.3% by volume |
| $N_2$ | 0.5% by volume | 0.5% by volume |
| $H_2O$ | 28.4% by volume | 11.2% by volume |

The second reactor 10 is filled with a nonlimited, conventional catalyst for a sour gas shift. A small amount of gas of 5612 m³(STP)/h is conveyed through the bypass and added back to the shifted crude gas as regulating parameter. After production of steam in the heat exchanger 12 and cooling in 2, the shifted gas is fed via line 8 to a chemical or physical gas scrub. After removal of the carbon dioxide, the desired $H_2/CO$ ratio in the synthesis gas of 2.1:1 is achieved.

EXAMPLE 4

As in example 3, the hot crude gasification gas leaves the gasification reactor at a temperature of 1600° C. In the quenching process, only steam which increases the thermal efficiency but leaves the amount of gas produced constant can be generated. Additional crude gas can be obtained by introduction of further fuel into the hot, uncooled crude gas by means of the endothermic gasification reactions in a second gasification stage according to (simplified)

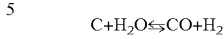

and is thereby cooled to 800° C.

This increases the cold gas efficiency and produces more synthesis gas. This operation is known as chemical quenching.

The invention proposes a kinetically regulated CO conversion by means of targeted configuration of the intrinsic catalyst activity. A catalyst having a mild intrinsic activity, improved stability and insensitivity to reaction changes has been developed (trademark ShiftMax® 821). If this catalyst is introduced into the first reactor in the process sequence, conventional reactors and normal reaction conditions can be employed. The catalyst can be employed for a wide range of steam-to-gas (S/G) ratios and temperatures, as a result of which integration into various gasification technologies is made possible.

The process of the invention can be employed for gasification facilities which provide a crude gas having an S/G ratio of from 0.1 to 2.5, preferably from 0.2 to 1.8. The CO content of the crude synthesis gas is from 40 to 90% (based on the dry gas), preferably from 50 to 70%, with the sulfur content being from 100 ppm to 5%, preferably from 300 ppm to 2%. The pressure of the crude synthesis gas is in the range from 0.1 to 12 MPa, preferably from 3 to 10 MPa. The synthesis gas may, for example, originate from the gasification of coal, heavy residues, biomass, waste or other carbon-rich material. FIG. 3 shows the process of the invention.

The first reactor is charged (provided) with a catalyst which has a mild intrinsic activity, improved stability and insensitivity to reaction changes. The catalyst in the first reactor converts the CO so as to reduce its proportion from 50-750 (based on the dry gas) down to 35-50% (based on the dry gas) at the outlet of the first reactor. The steam-to-gas ratio in the synthesis gas from the feed-producing gasification island can be from 0.1 to 2.5, preferably from 0.2 to 1.8. Steam 14 can optionally be added to the synthesis gas feed upstream of the inlet into the first reactor. Preference is given to no steam being introduced. The space velocity of the dry gas for the first reactor is from 1000 to 12 000/h, preferably from 2000 to 6000/h. The inlet temperature is in the range from 200 to 350° C., preferably from 230 to 300° C. The pressure is in the range from 0.1 to 12 MPa, preferably from 3 to 10 MPa.

The catalyst for the first reactor 9, which is designed for an intrinsic activity, has a support onto which metals have been applied. The metals are selected from among molybdenum or tungsten or a mixture thereof and cobalt or nickel or a mixture thereof. The proportion by weight of Mo/W is from 1 to 6%, preferably from 2 to 5%, and the proportion by weight of Co/Ni is from 0 to 1.0%, preferably from 0 to 0.5%, based on the total catalyst.

The support material is selected from the group consisting of aluminum oxide, silicon oxide, magnesium oxide, manganese oxide, zirconium oxide, titanium oxide, metal aluminates and other known materials and combinations thereof. The support material is shaped as extrudates, spherical bodies, pellets, cylinders, hollow bodies or other bodies with or without shaping and further configurations with which those skilled in the art will be familiar.

In an embodiment of the invention, the catalytically active constituents applied to the support comprise molybdenum and/or tungsten and cobalt and/or nickel. These active constituents are applied to the support material by conventional methods, for example coglazing, sequential dipping or joint impregnation/sequential impregnation with the components which are applied in the form of water-soluble salt solutions. Molybdenum and/or tungsten is usually applied, for example, in the form of ammonium molybdate and/or ammonium tungstate dissolved in an aqueous solution. Cobalt and/or nickel constituents can be applied to the support by impregnation with an ammine-carbonate solution or a nitrate solution.

After dipping/impregnation, the catalyst is dried and heat treated in order to convert the molybdenum and/or tungsten components and also the cobalt and/or nickel components into their oxide forms. In an embodiment of the invention, production of the catalyst comprises two heat treatment steps. The first heat treatment step serves to convert the nonoxidic constituents of the shaped support into oxides and to allow any stabilizing oxides to penetrate into the support material. After dipping or impregnation to introduce the active components onto or into the support material, a second heat treatment is carried out at a temperature of from 300° C. to about 600° C. in order to convert the salts and/or ammines of cobalt and/or nickel and also molybdenum and/or tungsten into their oxidic forms. In a particular embodiment, the production of the catalyst comprises a single heat treatment step. Here, the active components and the support are heat treated after shaping and then made ready for the ultimate use.

The strengthened material has a pore volume of from 0.2 to 1.5 cc/g, preferably from 0.3 to 0.7 cc/g. The surface area is in the range from 50 to 400 $m^2/g$, preferably from 100 to 250 $m^2/g$. The preferred catalyst is commercially available under the trade name ShiftMax® 821 from Clariant.

After provision of the catalyst, it is sulfided so that it can be used for the sour gas shift (SGS) reaction. The oxide form can be sulfided on site in the reactor or outside the reactor in a special facility. The catalyst is treated with a sulfur-containing gas, for example a mixture of hydrogen and hydrogen sulfide, a mixture of hydrogen and carbon disulfide, a mixture of hydrogen and mercaptan such as butyl mercaptan or a mixture of hydrogen and thiophenic constituents, dimethyl sulfide or dimethyl disulfide. Any sulfur-containing constituents which can be converted into hydrogen sulfide in the presence of hydrogen are encompassed by this sulfurization process. In addition, carrier gases such as nitrogen and hydrocarbons can be mixed into the fed gas stream. The sulfurization process in principle requires a number of hours and is completed in the course of passage of a hydrogen sulfide mixture or a mixture containing other sulfur components which can be converted into hydrogen sulfide in the presence of hydrogen and optionally carrier gases over the original catalyst at a customary space velocity.

The second reactor is charged with a sour gas shift (SGS) catalyst. The proportion of CO at the inlet is from 35 to 50% (based on the dry gas). The steam-to-gas (S/G) ratio is from 0.2 to 2, preferably from 0.3 to 1.2. Steam and feed which have been conveyed in the bypass past the first reactor 9 can be mixed into the stream from the outlet of the first reactor. The space velocity of the dry gas for the second reactor is from 1000 to 7000/h, preferably from 1500 to 4000/h. The inlet temperature is in the range from 200 to 350° C., preferably from 220 to 300° C. The pressure is in the range from 0.1 to 12 MPa, preferably from 3 to 10 MPa.

The catalyst for the second and optionally further stages comprises molybdenum or tungsten or else mixtures thereof and cobalt or nickel or else mixtures thereof. The total proportion of molybdenum and tungsten is from 4 to 12%, and that of cobalt and nickel is from 1 to 7%. The proportion of molybdenum/tungsten is preferably from 5 to 10%, and that of cobalt/nickel is preferably from 2 to 5%. The catalyst may additionally contain from 3 to 10% of alkali metal accelerators. The support material is selected from the group consisting of aluminum oxide, silicon oxide, magnesium oxide, manganese oxide, zirconium oxide, titanium oxide, metal aluminate and other known materials and also mixtures thereof. The material used is shaped as extrudates, bodies, pellets, cylinders hollow or otherwise, with or without shaping and other bodies as can be made by those skilled in the art. The strengthened material has a pore volume of from 0.2 to 1.5 cc/g, preferably from 0.4 to 0.8 cc/g. The surface area is in the range from 50 to 400 $m^2/g$, preferably from 100 to 250 $m^2/g$. The catalyst can be sulfated in the installed state by introduction of synthesis gas containing sulfur components or by addition of sulfur components to the synthesis gas fed in. The catalyst can also be introduced into the reactor in the sulfated state, in which case it is presulfated outside the reactor. The preferred catalysts are ShiftMax® 820 and ShiftMax® 822 (potassium-promoted) which are commercially available under this trademark from Clariant.

The process of the invention is illustrated by the process diagram in FIG. 3. Synthesis gas 1 from a gasification island with 14 or without addition of steam is passed through a heat exchanger 13 to produce the stream 3. Stream 3 is introduced into the reactor 1 which is charged with a catalyst designed with a mild intrinsic activity in order to partially convert CO. The stream 4 from the outlet of reactor 1 goes through a heat exchanger and, with or without addition of material 15 which has bypassed the first reactor, forms the stream 16. Steam 14 can if required, but not necessarily, be introduced into the stream 16 in order to adjust the S/G ratio for the feed 5 into the second reactor. The outlet stream from the second reactor 9 either goes through one or more additional sour gas shift stage(s) 17 in order to produce a hydrogen-rich gas or goes to cooling 2 and a gas scrub stage 8. Depending on the gas composition desired for the subsequent process, it can be supplied via an adjustable bypass 7 to the second reactor 10.

Example 5 is an embodiment of the invention as per FIG. 3. This embodiment can be used for the SGS of crude gas from gasification technologies which give a high proportion of CO (>50% (based on the dry gas)) with a low S/G ratio (<0.5). Two simple adiabatic fixed beds are inserted in the process sequence, with designed intrinsic activity catalysts (e.g. ShiftMax® 821) and conventional MT/HT-SGS catalysts (e.g. ShiftMax® 820) being installed in the reactor 1 and the reactor 2, respectively. Steam 14 is mixed into the stream 4 from the reactor 1 downstream of the heat exchanger 13.

For example 5, characteristic compositions for the measurement points indicated are shown in the table of FIG. 4.

In this process embodiment, the maximum temperatures of reactor 1 and reactor 2 are in an optimized range (378° C. and 413° C., respectively) which gives a better CO shift reaction, a minimized secondary reaction (methanation) and improved catalyst stability. The production process can be carried out simply and in a regulated manner. The discharged gas (stream 17) can be fed to a reactor 3 for production of high-purity hydrogen for synthesis of ammonia, a refinery or another use. It can also be fed to a scrubbing system 2 and, after mixing with crude synthesis gas or the stream 7 in order to adjust the composition, to the synthesis of methanol, SNG or other processes with the desired $H_2$/CO ratio.

Example 6 is an embodiment according to the invention as per FIG. 3. This embodiment can be used for SGS of synthesis gas from gasification technologies which give a high proportion of CO (>50% (based on the dry gas)) with a high S/G ratio (>1). Two simple adiabatic fixed beds are inserted in the process sequence, with designed intrinsic activity catalysts (e.g. ShiftMax® 821) and conventional MT/HT-SGS catalysts (e.g. ShiftMax® 820) being installed in the reactor 1 and the reactor 2, respectively. No steam 14 is required as addition for the reactor 2.

For example 6, characteristic compositions for the measurement points indicated are shown in the table of FIG. 5.

In this process embodiment, the maximum temperatures of reactor 1 and reactor 2 are in an optimized range (340° C. and 416° C., respectively) which gives a better CO shift reaction, a minimized secondary reaction (methanation) and improved catalyst stability. The production process can be carried out simply and in a regulated manner. The discharged gas (stream 17) can be fed to a reactor 3 for production of high-purity hydrogen for synthesis of ammonia, a refinery or another use. It can also be fed to a scrubbing system and, after mixing with crude synthesis gas or the stream 11 in order to adjust the composition, to the synthesis of methanol, SNG or other processes with the desired $H_2/CO$ ratio.

Example 7 is an embodiment according to the invention as per FIG. 3. This embodiment can be used for SGS of synthesis gas from gasification technologies which give a high proportion of CO (>50% (based on the dry gas)) with a moderate S/G ratio (0.5-1). Two simple adiabatic fixed beds are inserted in the process sequence, with designed intrinsic activity catalysts (e.g. ShiftMax® 821) and conventional LT-SGS catalysts (e.g. ShiftMax® 822) being installed in the reactor 1 and the reactor 2, respectively. No steam is required as addition for the reactor 2.

For example 7, characteristic compositions for the measurement points indicated are shown in the table of FIG. 6.

In this process embodiment, the maximum temperatures of reactor 1 and reactor 2 are in an optimized range (370° C. and 380° C., respectively) which gives a better CO shift reaction, a minimized secondary reaction (methanation) and improved catalyst stability. The production process can be carried out simply and in a regulated manner. The discharged gas (stream 17) can be fed to a reactor 3 for production of high-purity hydrogen for synthesis of ammonia, a refinery or another use. It can also be fed to a scrubbing system and, after mixing with crude synthesis gas or the stream 11 in order to adjust the composition, to the synthesis of methanol, SNG or other processes with the desired $H_2/CO$ ratio.

LIST OF REFERENCE NUMERALS

1 Crude gas stream from the gas scrub
2 Gas cooling
3 Crude gas to the first reactor 9
4 Partially shifted crude gas
5 Partially shifted crude gas to the second reactor 10
6 Shifted crude gas after the second reactor 10
7 Bypass stream
8 Shifted crude gas to the chemical or physical gas scrub
9 First reactor
10 Second reactor
11 Heat exchanger
12 Heat exchanger
13 Gas-gas heat exchanger
14 High-pressure steam
15 Stream conveyed past the first reactor (9)
16 Partially shifted crude gas (4) and stream (15)

The invention claimed is:

1. A process for the treatment of crude gases obtained in gasification of solid or liquid carbon-containing starting materials in an entrained-flow, a fixed-bed or a fluidized-bed gasification, the process comprising:

conducting the treatment of the crude gases at up to pressures of 12 MPa and at temperatures of up to 1900° C.;
using a shift technology for achieving a predetermined $H_2/CO$ ratio of a synthesis gas, by feeding the crude gas sequentially through at least two shift reactors, wherein the feeding of the crude gas through the first shift reactor is with the crude gas freed of entrained solids, and wherein the first shift reactor contains a reaction-kinetically limited catalyst with mild intrinsic activity; and
the feeding of the second shift reactor is with the partially shifted crude gas fed from said first shift reactor, wherein the second shift reactor contains a catalyst which is not reaction-kinetically limited.

2. The process as claimed in claim 1, further comprising:
performing the gasification in a gasification reactor; and
directly cooling the hot crude gas leaving the gasification reactor by spraying water at the crude gas in a quenching chamber and then;
passing the crude gas through a heat exchanger system located downstream of the quenching chamber for cooling the crude gas to the inlet temperatures of the first shift reactor of from 200 to 350° C.

3. The process as claimed in claim 1, further comprising indirectly cooling the hot crude gas leaving a gasification reactor in a waste heat combination comprising radiation and convection coolers connected in series.

4. The process as claimed in claim 1, further comprising cooling the hot crude gas leaving a gasification reactor by combination of direct and indirect cooling using a partial quench and a convection cooler with steam generation which are connected in series.

5. The process as claimed in claim 4, further comprising performing the partial quenching is by spraying in a limited amount of water.

6. The process as claimed in claim 4, further comprising performing the partial quenching by introducing a colder gas.

7. The process as claimed in claim 4, further comprising performing the partial quenching by chemical quenching comprising introducing further fuel into the hot crude gas leaving the gasification reactor.

8. The process as claimed in claim 1, further comprising subjecting the crude gas to dust precipitation down to residual contents of 1 mg/m³ before entering the crude gas into the first shift reactor of the shift technology.

9. The process as claimed in claim 1, further comprising providing the crude gas at a temperature which is at least 20° C. above the temperature at which water vapor condensation commences before the crude gas enters the first shift reactor of the shift technology.

10. The process as claimed in claim 1, further comprising the crude gas which has been partially shifted in the first shift reactor, and the first shift reactor that is provided with the reaction-kinetically limited catalyst, does not exceed an outlet temperature of 480° C.

11. The process as claimed in claim 1, further comprising mixing part of the crude gas fed into the first and the second shift reactors into the partially shifted crude gas from the first shift reactor before the crude gas enters the second shift reactor.

12. The process as claimed in claim 1, further comprising adding a part of the crude gas which has been partially shifted in the first shift reactor to the fully shifted crude gas downstream of the second shift reactor.

13. The process as claimed in claim 1, further comprising when the crude gas enters the first shift reactor, setting the steam/gas ratio in the range from 0.1 to 2.5.

14. The process as claimed in claim 1, further comprising before the crude gas enters the first shift reactor setting the CO concentration of the crude gas in the range from 40 to 90% by volume based on the dry gas.

15. The process as claimed in claim 1, further comprising the support material of the reaction-kinetically limited catalyst used in the first shift reactor is selected from the group consisting of aluminum oxide, silicon oxide, magnesium oxide, manganese oxide, zinc oxide, titanium oxide, metal aluminates and mixtures thereof.

16. The process as claimed in claim 1, further comprising the reaction-kinetically limited catalyst having catalytically active components is formed by molybdenum and cobalt and mixtures thereof, wherein the concentration is in the range from 1 to 6% by mass.

17. The process as claimed in claim 1, further comprising the reaction-kinetically limited catalyst having catalytically active components is formed by cobalt and nickel and mixtures thereof, wherein the concentration is up to 1.0% by mass.

18. The process as claimed in claim 1, further comprising the reaction-kinetically limited catalyst having a specific surface area in the range from 50 to 400 m2/g.

19. The process as claimed in claim 1, further comprising the reaction-kinetically limited catalyst is a specific catalyst having the designation ShiftMax ® 821.

20. The process as claimed in claim 19, further comprising sulfiding the reaction-kinetically limited catalyst having the designation ShiftMax ® 821 before feeding the crude gas to the first reactor .

21. The process as claimed in claim 19, further comprising sulfiding the reaction-kinetically limited catalyst having the designation ShiftMax ® 821 outside the reactor before feeding the crude gas to the first reactor.

22. The process as claimed in claim 19, further comprising sulfiding the reaction-kinetically limited catalyst having the designation ShiftMax ® 821 in the shift reactor before feeding the crude gas to the first reactor.

23. The process as claimed in claim 1, further comprising the partially shifted crude gas leaving the first reactor which contains the reaction-kinetically limited catalyst, wherein the partially shifted crude gas has a CO content of from 35 to 50% by volume (based on the dry gas) and feeding the partially shifted crude gas with this content to the second shift reactor which contains a catalyst which is not reaction-kinetically limited.

24. The process as claimed in claim 1, wherein the shifted crude gas at the outlet of the second shift reactor does not exceed a temperature of 480° C.

25. The process as claimed in claim 1, further comprising feeding the shifted crude gas leaving the second shift reactor to a chemical or physical scrub to remove interfering gases.

26. The process as claimed in claim 1, further comprising continuing the shift reaction until a pure synthesis gas having an H2/CO ratio in the range from 1.9 to 2.4 is formed after the removal of CO2 and other interfering gases.

27. The process as claimed in claim 1, further comprising feeding the synthesis gas produced by the specific shift process to a synthesis of methanol.

28. The process as claimed in claim 1, further comprising feeding the synthesis gas produced by the specific shift process to a Fischer-Tropsch synthesis.

29. The process as claimed in claim 1, further comprising producing olefins using the synthesis gas produced by the specific shift process.

30. The process as claimed in claim 1, further comprising feeding the synthesis gas produced by the specific shift process to a synthesis according to a sequence methanol-dimethyl ether-olefin-end product.

31. The process as claimed in claim 1, further comprising feeding the synthesis gas produced by the specific shift process to a synthesis of ammonia.

32. The process as claimed in claim 1, further comprising feeding the synthesis gas produced by the specific shift process to a synthesis of methane.

* * * * *